Feb. 28, 1928.

S. B. WINN 1,660,945

SPRING SUPPORTED COUPLER PIN

Filed March 13, 1926     3 Sheets-Sheet 1

Inventor

Sidney B. Winn,

By

Attorneys

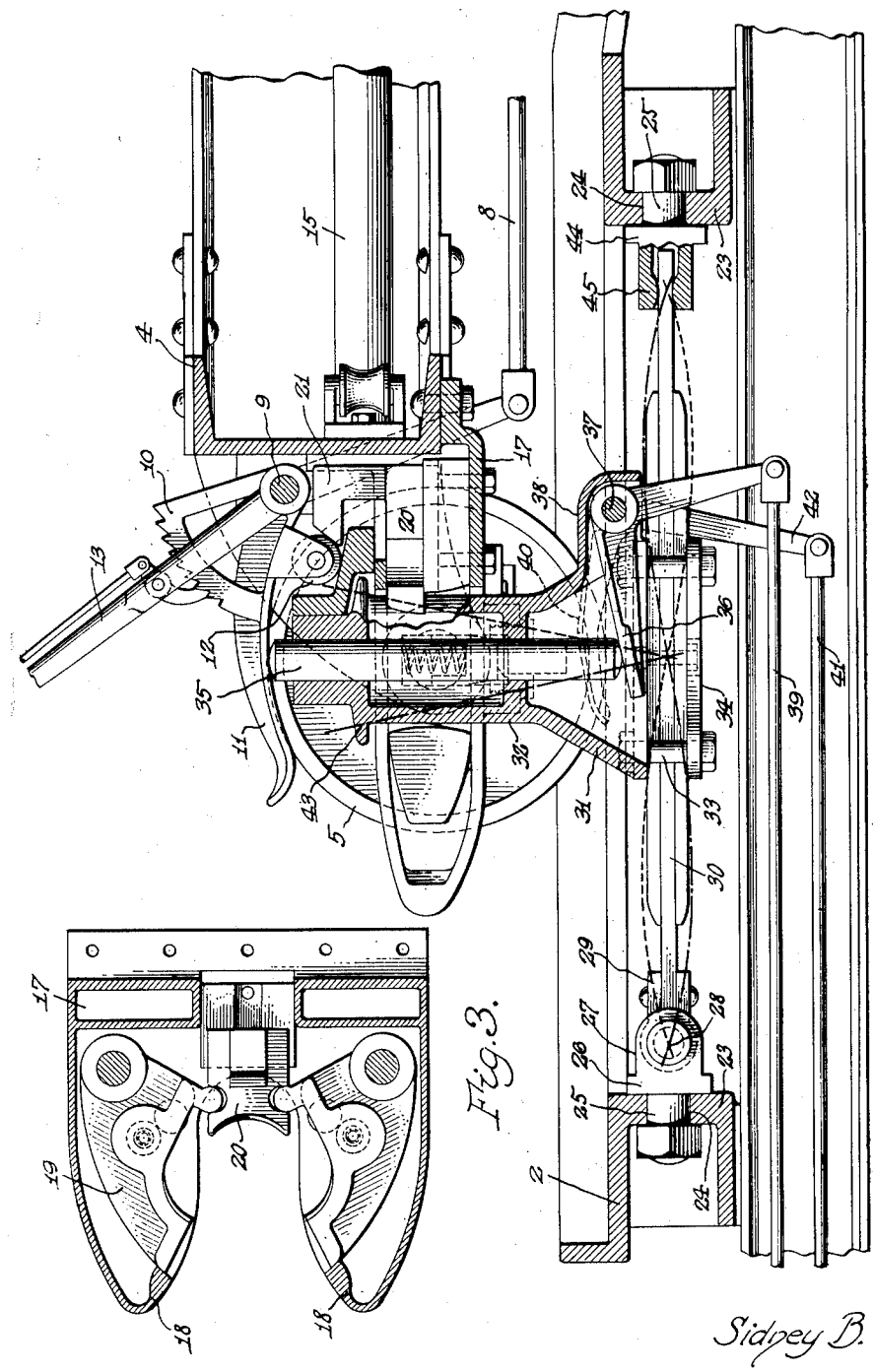

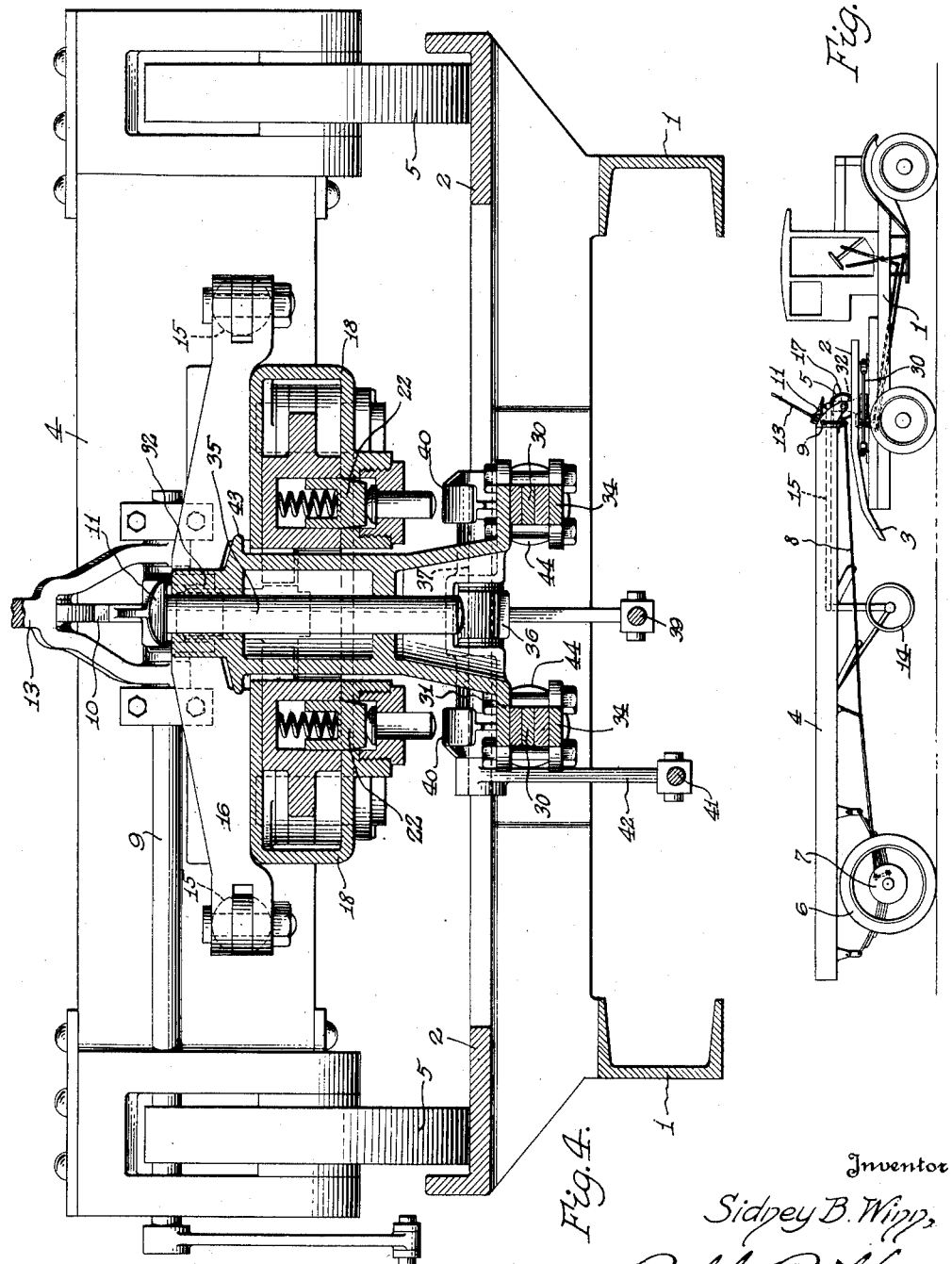

Patented Feb. 28, 1928.

1,660,945

UNITED STATES PATENT OFFICE.

SIDNEY B. WINN, OF LAPEER, MICHIGAN.

SPRING-SUPPORTED COUPLER PIN.

Application filed March 13, 1926. Serial No. 94,405.

This invention, in its broadest aspect, involves supporting means for a coupler member forming part of the coupler especially designed for connecting vehicles. The supporting means for the coupler member functions somewhat similar to a draft appliance insomuch that it affords a yieldable connection between two vehicles. Specifically, my invention relates to that type of coupler employed for establishing an operative relation between towing and towed vehicles, for instance a tractor trailer combination, wherein the forward end of a semi-trailer is supported on the rear end of the tractor and operatively connected thereto for a combined service condition. My Patent No. 1,548,967, dated Aug. 11, 1925, is a disclosure for a tractor semi-trailer combination wherein a draft appliance on the rear end of the tractor yieldably supports the forward end of the trailer, which is connected to the tractor by a novel form of coupler. The trailer has a brake mechanism which is operatable through the coupler from the tractor or may be manually controlled when the trailer is independent of the tractor. For such independent service the trailer has a supporting leg that descends by gravity or by having impetus imparted thereto and assumes an active position when the tractor withdraws from the trailer and the supporting leg includes an instrumentality by which the trailer brakes are set to prevent accidental movement of the trailer. Backing of the rear end of the tractor under the forward end of the trailer elevates the supporting leg to an inactive position and releases the trailer brakes simultaneously or prior to a coupled relation being established between the tractor and trailer. Such briefly, is an outline of a tractor trailer combination to which the present invention is applicable although I now make other types of couplers which are disclosed for instance in my pending application filed Mar. 13, 1926, Ser. No. 94,406.

As set forth in the beginning, this invention includes a coupling member yieldably supported and said member is in the form of a king pin having its lower end yieldably supported so that its upper end may have an oscillatory movement of a more less universal characteristic which is advantageous when coupling the tractor to a trailer, when starting off with a loaded trailer, and when either the tractor or trailer is subjected to road shocks.

My invention will be hereinafter specifically described and then claimed, and reference will now be had to the drawings, wherein Figure 1 is a plan of a tractor semi-trailer coupler having a tractor member supported in accordance with this invention;

Fig. 2 is a longitudinal sectional view of the same;

Fig. 3 is a horizontal sectional view of the trailer coupler head;

Fig. 4 is a cross sectional view of the tractor trailer coupler shown in Figs. 1 and 2, and Fig. 5 is a diagrammatic elevation of a tractor semi-trailer combination.

Figure 1:
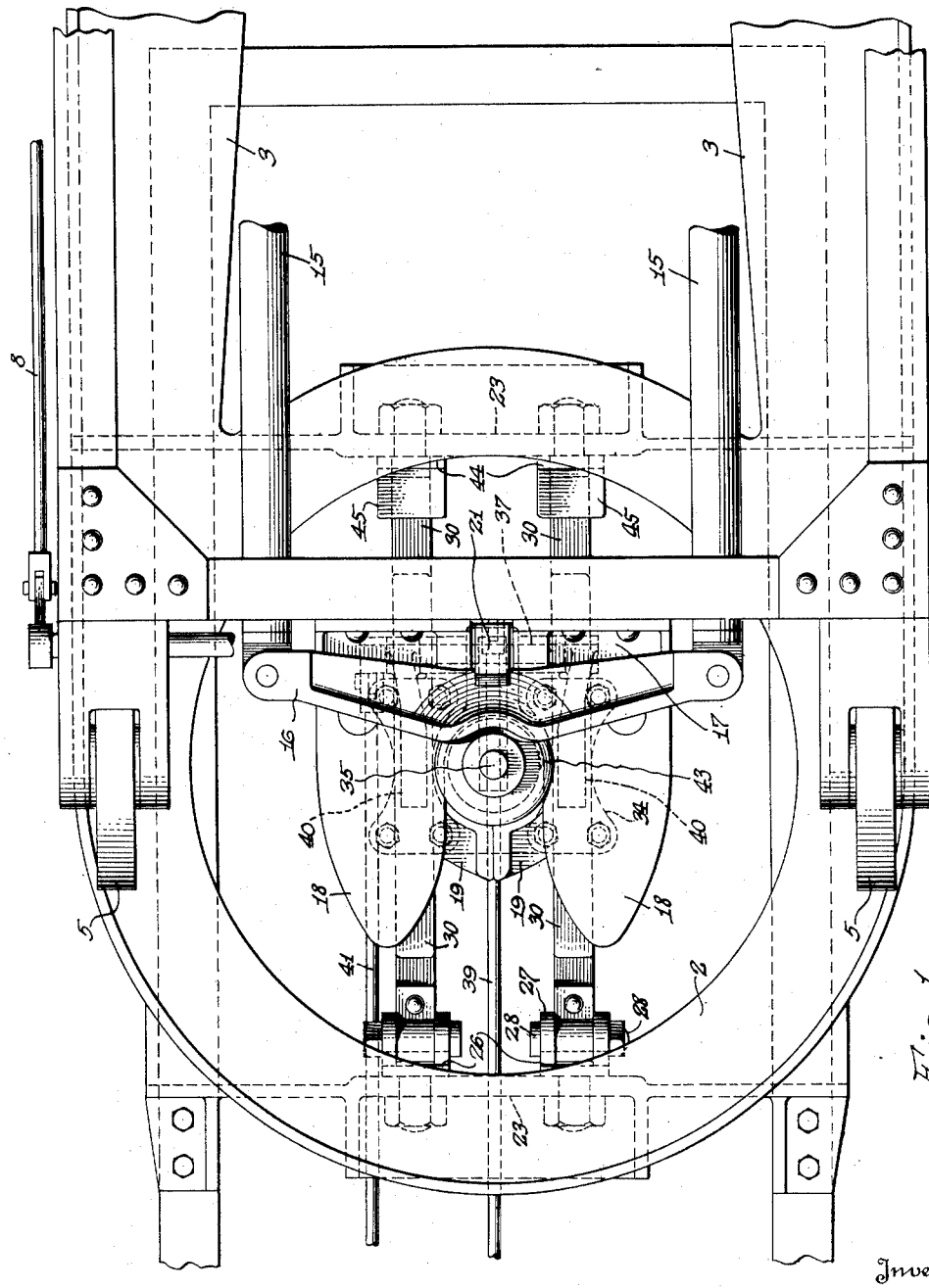

Considering Fig. 5 there is a tractor or towing vehicle 1 having its rear end provided with a supporting platform 2 which has inclined ways or a track 3 so that the rear end of the tractor may be backed under the forward end of a trailer or towed vehicle 4. For this purpose the forward end of the trailer 4 has wheels or rollers 5 that ascend the inclined ways 3 and rest on the platform 2 during a combined service condition of the tractor 1 and the trailer 4. The trailer 4 has a rear axle assembly 6 including brakes 7 and a brake operating mechanism 8. The brake operating mechanism 8 includes a rock shaft 9, a sector 10, a brake setting shoe 11 provided with a roller 12 and a hand lever 13 by which the brake operating mechanism 8 may be manually controlled.

For supporting the forward end of the trailer 4 independent of the tractor 1 there is a supporting leg 14 adapted to descend to an active position. When the tractor is backed under the forward end of the trailer the supporting leg is raised by leg members 15 including a cross head 16, and the trailer brakes are released after the tractor and trailer have been coupled together, as will hereinafter appear.

On the forward end of the trailer 4 is a coupler head 17 having hollow jaws 18 with pivoted opposed knuckles 19 therein. These knuckles engage a knuckle actuating member 20 slidable in the head 17 and provided with a brake setting member 21 which is adapted to ride under the roller 12 and actuate the trailer brake operating mechanism 8 to apply the trailer brake 7 as the tractor withdraws from the trailer. The coupler knuckles 19 are adapted to be secured in a closed position by locking members 22 which are releasable from the tractor 1, so that the knuckles 19 may laterally swing to an open position to permit of the tractor and trailer being uncoupled.

Again considering the platform 2 and my prior Patent No. 1,548,967, above referred to, it will be noted that the platform 2 has transverse members or rod bearings, which I now designate 23. Draft rods were slidable in these bearings and I now use the same rod openings for my yieldable coupling member support. This obviates making any material changes in the tractor platform which is extensively used, therefore the whole draft appliance can be readily removed, should it be so desired, and my improved coupling member support placed in the platform.

Where were previously rod openings now become stud bolt openings 24 for nut equipped stud bolts 25. These bolts are in two opposed sets, one forward of the other, and the forward bolts have heads 26 provided with apertured ears 27 for anchor pins or bolts 28 on which are pivoted or loosely mounted shackles 29 supporting the forward ends of horizontally disposed comparatively flat laminated springs or flexible members 30 which cooperate in providing a yieldable support for the base 31 of a normally upright coupler member or pin 32.

The bolts 25 at the rear ends of the springs or flexible members 30 have heads 44 provided with horizontally slotted keepers 45 into which extend the rear ends of the springs or flexible members 30. The rear ends of the springs or flexible members 30 are loosely supported in the keepers to assume an angular relation therein incident to the springs being flexed for a single or compound bowed condition. With the forward end of the springs pivoted and the rear ends loosely supported there is a freedom of spring adjustment for the various angular positions the coupling member 32 may assume, in addition to the resiliency afforded by the springs alone.

The base 31 of the coupling member spans the springs or flexible members 30 and may be secured thereto by nut equipped bolts 33 and a bottom plate 34. Slidable in the coupling member 32 is a brake pin 35 adapted to have its upper end engage the brake setting shoe 11 so that the trailer brakes may be controlled by raising the brake pin 35. This is accomplished by a bell crank 36 engaging the lower end of the brake pin and said bell crank is pivotally mounted, as at 37 in an extension 38 of the base. A reach rod 39 is connected to the bell crank 36 and said rod extends forward to an operating lever in the cab of the tractor 1. A driver of the tractor may control the trailer brakes when the coupling member 32 is held by the knuckles 19 of the trailer coupler head 18, and in order that the tractor driver may release the knuckles 19, to permit of the coupler member 32 opening said knuckles by the tractor withdrawing from the trailer, the same pivotal mounting 37 for the bell crank 36 supports cranks 40 for raising the locking members 22 of the coupler head. This arrangement is best shown in Fig. 4 and by referring to Fig. 2, it will be noted that the cranks 40 may be actuated from the cab of the tractor by a suitable lever connected to a reach rod 41 and a crank 42. These controlling mechanisms of the tractor have been considered in my pending application, above referred to and are included herein because of support by the base 31 of the coupler member pin 32. Irrespective of the position of the coupler member in the coupled relation the trailer brakes are controllable from the tractor. With the coupler member or pin normally upright it cooperates with the coupler head 18 and the wheels 5 of the trailer in providing the operative swiveled connection between the tractor and trailer for a combined service of these two vehicles. The yieldable support of the coupler member may flex for vertical movement of said coupler member between the knuckles 19 of the coupler head, but such movement is inconsequential on account of the wheels 5 bearing on the platform 2. However, should the wheels attempt to raise from the platform the head or flange 43 of the coupler member limits the upward movement of the coupler head and the yieldable support 30 may be slightly bowed to yield in a vertical direction. The important function of the yieldable support is that of permitting the upper end of the coupling member to swing in an arc or the coupler member bodily assume an angle to the perpendicular. Lateral forces directed against the coupling member by the tractor may cause the coupler member to tilt forward, for instance when the trailer attempts to crowd or push the tractor. This angular relation has been brought out by dot and dash lines in Fig. 2. A rear tilting action of the coupler member is indicated by dotted lines, such action being possible when the tractor starts off with a load. These two movements may be considered in the longitudinal plane of the tractor, but even with the tractor at an angle to the trailer, the coupling member may have its upper end swung out of the vertical plane, somewhat in a sidewise direction, because one of the springs or flexible members 30 may be depressed while the other is raised. Under all operating conditions the coupler member 32 has its base or lower end yieldably supported because the springs or flexible members 30 may be flexed and yet afford a substantial support for the coupling member to establish a coupled relation between the tractor and trailer.

What I claim is:—

1. The combination of vehicles adapted to be coupled together with the trailer having a superposed relationship to the tractor, a coupler for said vehicles, said coupler being inactive in the support of the trailer load by the tractor, a substantially upright member forming part of said coupler, and a flexible support for said upright member and upon which the member is mounted.

2. The combination called for in claim 1, wherein said support is substantially horizontal and has said upright member substantially central thereof.

3. The combination called for in claim 1, wherein said support may be flexed for vertical or oscillatory movement of said upright member.

4. The combination called for in claim 1, wherein said support is in the form of a pair of comparatively flat springs having ends thereof held for flexure of said springs.

5. The combination called for in claim 1, wherein said support is in the form of laminated springs having pivotally held ends and loosely held ends.

6. The combination of vehicles adapted to be coupled together with the trailer having a superposed relationship to the tractor, a coupler for said vehicles, said coupler being inactive in the support of the trailer load by the tractor, a spring supported coupler member forming part of said coupler, brakes for one of said vehicles, and brake operating mechanism operable from the tractor and associated with said coupler member and movable therewith.

7. The combination called for in claim 6, wherein said brake operating mechanism includes a brake pin extending axially of said coupler member and pin actuating means at the base of said coupler member.

8. In a tractor trailer combination wherein a tractor is adapted to have its rear end backed under the forward end of a trailer and coupled thereto, and wherein the trailer has a raisable supporting leg by which the trailer may be used independent of the tractor; a coupler for the tractor and trailer, said coupler being inactive in the support of the trailer load by the tractor, said coupler including a normally upright member adapted to raise the trailer supporting leg when the tractor is backed into engagement with the trailer, and means supporting said upright member for universal movement on said tractor.

9. A tractor trailer combination as called for in claim 8, wherein said means includes a set of comparatively flat springs.

10. A tractor trailer combination as called for in claim 8, wherein said upright member has a base that may assume various angles to the horizontal to permit of said upright member adjusting itself to a connected relation of the tractor and trailer.

11. A tractor trailer combination as called for in claim 8, wherein said means includes a support that may be bowed to swing said upright in an arc relative to the horizontal.

12. In a tractor trailer combination, a trailer having a lowered raisable supporting leg and an applied brake mechanism, a tractor adapted to be coupled to the trailer and automatically raise the supporting leg of the trailer and release the brakes thereof, a coupler member of the tractor to effect such leg raising and brake release, and means on said tractor supporting said coupler member for bodily movement at will in a vertical direction relative to said tractor.

13. A tractor trailer combination as called for in claim 12, wherein said means includes a support that may be bowed.

14. The combination of vehicles adapted to be coupled together with the forward end of one vehicle resting on the rear end of the other vehicle, a coupler for said vehicles, said coupler being inactive in the support of the trailer load by the tractor, and yieldable means under said coupler adapted to resist vertical movement of said coupler and the forward end of said vehicle.

15. The combination called for in claim 14, wherein said means supports a portion of said coupler so that said coupler portion may bodily assume an angular position.

16. The combination of vehicles adapted to be coupled together with the trailer having a superposed relationship to the tractor, a coupler for said vehicles, said coupler being inactive in the support of the trailer load by the tractor, a coupler member forming part of said coupler, and a spring support for and upon which said member is mounted.

In testimony whereof I affix my signature.

SIDNEY B. WINN.